United States Patent
Ma et al.

(10) Patent No.: US 12,219,645 B2
(45) Date of Patent: Feb. 4, 2025

(54) METHOD, DEVICE AND COMPUTER PROGRAM PRODUCT FOR WIRELESS COMMUNICATION

(71) Applicant: ZTE CORPORATION, Guangdong (CN)

(72) Inventors: Wei Ma, Shenzhen (CN); Hongjun Liu, Shenzhen (CN); Chen Lu, Shenzhen (CN); Zijiang Ma, Shenzhen (CN); Dongmei Li, Shenzhen (CN); Wu Wen, Shenzhen (CN); Boshan Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 317 days.

(21) Appl. No.: 17/876,745

(22) Filed: Jul. 29, 2022

(65) Prior Publication Data
US 2023/0020986 A1 Jan. 19, 2023

Related U.S. Application Data

(63) Continuation of application No. PCT/CN2021/071935, filed on Jan. 14, 2021.

(51) Int. Cl.
*H04W 76/20* (2018.01)
*H04W 72/231* (2023.01)
*H04W 76/25* (2018.01)
*H04W 76/27* (2018.01)
*H04W 76/30* (2018.01)

(52) U.S. Cl.
CPC ......... *H04W 76/20* (2018.02); *H04W 72/231* (2023.01); *H04W 76/25* (2018.02); *H04W 76/27* (2018.02); *H04W 76/30* (2018.02)

(58) Field of Classification Search
None
See application file for complete search history.

(56) References Cited

U.S. PATENT DOCUMENTS

| 2022/0330374 | A1* | 10/2022 | Kim | H04W 76/30 |
| 2023/0397286 | A1* | 12/2023 | Dai | H04W 76/25 |
| 2024/0064852 | A1* | 2/2024 | Wang | H04W 76/30 |

FOREIGN PATENT DOCUMENTS

| CN | 107404762 A | 11/2017 |
| CN | 110139386 A | 8/2019 |
| CN | 110636565 A | 12/2019 |
| CN | 111641976 A | 9/2020 |
| CN | 111757418 A | 10/2020 |

(Continued)

OTHER PUBLICATIONS

International Search Report and Written Opinion for PCT Appl. No. PCT/CN2021/071935, mailed Oct. 20, 2021 (6 pages).

(Continued)

*Primary Examiner* — Jutai Kao

(74) *Attorney, Agent, or Firm* — Foley & Lardner LLP

(57) ABSTRACT

Method, device and computer program product for wireless communication are provided. A method includes: transmitting, by a first wireless communication node, a control message to a second wireless communication node, to control the second wireless communication node to instruct a wireless communication terminal to enter a radio resource control, RRC, inactive mode and transmitting at least one small data transmission, SDT, configuration to the wireless communication terminal.

16 Claims, 8 Drawing Sheets

(56) References Cited

FOREIGN PATENT DOCUMENTS

| EP | 3 361 821 A1 | 8/2018 |
|---|---|---|
| WO | WO-2019/242341 A1 | 12/2019 |
| WO | WO-2020/087280 A1 | 5/2020 |
| WO | WO-2020/171369 A1 | 8/2020 |
| WO | WO-2022/077338 A1 | 4/2022 |

OTHER PUBLICATIONS

First Office Action for CN Appl. No. 202211440033.9, dated Apr. 21, 2023 (with English translation, 20 pages).
Huawei, "(TP for NR BL CR for TS 38.401): on RRC state transition for CP-UP separation", 3GPP TSG-RAN WG3 meeting#99bis, R3-182130, Apr. 20, 2018, Sanya, China (5 pages).
Huawei, "Open issues for RRC inactive support in CU-DU", 3GPP TSG RAN WG3 meeting #97bis, R3-173721, Aug. 13, 2017, Prague, Czech (4 pages).
Intel Corporation, "Radio bearer configuration for SDT considering UE context relocation and CU/DU split", 3GPP TSG RAN WG2 Meeting #111-e, R2-2006714, Aug. 28, 2020, e-Meeting (6 pages).
Extended European Search Report for EP Appl. No. 21918487.6, dated Oct. 9, 2023 (15 pages).
ZTE Corporation et al., "Details of RRC-based IDT", 3GPP TSG-RAN2#111e, R2-2007449, Aug. 28, 2020 (18 pages).
Notice of Grant dated Jul. 1, 2023 with Search Report for CN App. 2022114400339.
CATT, "Requirements and Scopes of Small Data Transmission" 3GPP TSG-RAN WG2 Meeting #111, R2-2006991, Aug. 28, 2020, Online (3 pages).
Intel Corporation, "RACH selection and User plane aspects with and without anchor relocation" 3GPP TSG-RAN WG2 Meeting #112-e, R2-2008994, Nov. 13, 2020, Electronic Meeting (6 pages).
Intel Corporation, "Radio bearer configuration for SDT considering UE context relocation and CU/DU split" 3GPP TSG RAN WG2 Meeting #111-e, R2-2006714, Aug. 28, 2020, Electronic Meeting (6 pages).
Intel Corporation, "SDT control plane procedures and failure handling" 3GPP TSG-RAN WG2 Meeting #112-e, R2-2008993, Nov. 13, 2020, Electronic Meeting (9 pages).
Intel Corporation, "SDT mechanism on RRC/non-RRC based approaches and RACH requirements" 3GPP TSG RAN WG2 Meeting #111-e, R2-2006713, Aug. 28, 2020, Electronic Meeting (10 pages).
LG Electronics Inc., "Considerations on UL small data transmission" 3GPP TSG-RAN WG2 #111e, R2-2008015, Aug. 28, 2020 (3 pages).
Nokia et al., "Details on RACH specific schemes" 3GPP TSG-RAN WG2 Meeting #112 Electronic, R2-2009799, Nov. 13, 2020, Elbonia (4 pages).
Sony, "Discussion on different aspects of UL Small data transmissions in NR" 3GPP TSG-RAN WG2 Meeting #111 electronic, R2-2007180, Aug. 28, 2020, Online (4 pages).
Huawei, "Inter-CU migration procedure", 3GPP TSG-RAN WG3 meeting #110-e, R3-206665, Nov. 12, 2020, E-meeting (5 pages).
NEC, "Draft LS on Need of MAC-I for UE authentication", 3GPP TSG-RAN WG2 #112-e, R2-2009991, Nov. 13, 2020, Electronic meeting (2 pages).
Nokia (Moderator), "Summary of Offline Discussion on Reduction of Service Interruption reduction", 3GPP TSG-RAN WG3 #110-e, R3-207165, Nov. 12, 2020, Online (2 pages).
Notice of Grounds of Rejection for JP Appl. No. 2022-552259, dated Dec. 10, 2024 (with English translation, 12 pages).
TSG RAN WG2, "LS on physical layer aspects of small data transmission", 3GPP TSG RAN WG1 #104-e, R1-2100025, Feb. 5, 2021, e-Meeting (2 pages).

* cited by examiner

METHOD, DEVICE AND COMPUTER PROGRAM PRODUCT FOR WIRELESS COMMUNICATION

CROSS-REFERENCE TO RELATED APPLICATION

This application claims the benefit of priority under 35 U.S.C. § 120 as a continuation of PCT Patent Application No. PCT/CN2021/071935, filed on Jan. 14, 2021, the disclosure of which is incorporated herein by reference in its entirety.

TECHNICAL FIELD

This document is directed generally to wireless communications.

SUMMARY

In New Radio (NR) of 5G communication, UEs (user equipments) can enter an RRC_INACTIVE state/mode (also referred to as INACTIVE state/mode in the paragraphs below) to reduce power consumption. Typically, in the RRC_INACTIVE state, a UE cannot transmit data. Thus, the UE has to resume connections (i.e., switches back to the RRC_CONNECTED state) for the downlink (e.g., mobile termination (MT)) and uplink (e.g., mobile originated (MO)) data. However, for small and infrequent data transmission, building up and releasing connections each time when the transmission is needed is inefficient and power consuming.

Accordingly, methods for small data transmission in the RRC_INACTIVE state and relevant configurations for the network nodes and UEs are needed.

The present disclosure relates to methods, devices, and computer program products for wireless communication, which can allow a UE to perform small data transmission (SDT).

One aspect of the present disclosure relates to a wireless communication method. In an embodiment, the wireless communication method includes transmitting, by a first wireless communication node, a control message to a second wireless communication node, to control the second wireless communication node to instruct a wireless communication terminal to enter a radio resource control, RRC, inactive mode and transmitting at least one small data transmission, SDT, configuration to the wireless communication terminal.

Another aspect of the present disclosure relates to a wireless communication method. In an embodiment, the wireless communication method includes: receiving, by a second wireless communication node, a control message from a first wireless communication node; transmitting, by the second wireless communication node, an RRC message to a wireless communication terminal, the RRC message is included in the control message from a first wireless communication node; and refraining, by the second wireless communication node, from releasing information associated with the wireless communication terminal according to the control message.

Another aspect of the present disclosure relates to a wireless communication method. In an embodiment, the wireless communication method includes: receiving, by a wireless communication terminal, a suspend indication from a second wireless communication node or a third wireless communication to enter a radio resource control, RRC, inactive mode according to the suspend indication; and receiving, by the wireless communication terminal, at least one small data transmission, SDT, configuration from the second wireless communication node or the third wireless communication.

Another aspect of the present disclosure relates to a wireless communication node. In an embodiment, the wireless communication node includes a communication unit and a processor. The processor is configured to transmit a control message to a second wireless communication node, to control the second wireless communication node to instruct a wireless communication terminal to enter a radio resource control, RRC, inactive mode and transmitting at least one small data transmission, SDT, configuration to the wireless communication terminal.

Another aspect of the present disclosure relates to a wireless communication node. In an embodiment, the wireless communication node includes a communication unit and a processor. The processor is configured to: receive a control message from a first wireless communication node; transmit an RRC message to a wireless communication terminal, the RRC message is included in the control message from a first wireless communication node; and refrain from releasing information associated with the wireless communication terminal according to the control message.

Another aspect of the present disclosure relates to a wireless communication terminal. In an embodiment, the wireless communication terminal includes a communication unit and a processor. The processor is configured to: receive a suspend indication from a second wireless communication node or a third wireless communication to enter a radio resource control, RRC, inactive mode according to the suspend indication; and receive at least one small data transmission, SDT, configuration from the second wireless communication node or the third wireless communication.

Various embodiments may preferably implement the following features:

Preferably, the control message comprises an RRC message comprising the SDT configuration and a suspend indication for making the wireless communication terminal enter the RRC inactive mode, and the second wireless communication node is configured to forward this RRC message to the wireless communication terminal transparently.

Preferably, the control message comprises an information element for preventing the second wireless communication node from releasing information associated with the wireless communication terminal.

Preferably, the information associated with the wireless communication terminal is used for SDT between the wireless communication terminal and the second wireless communication node.

Preferably, the information associated with the wireless communication terminal comprises at least one of following: at least one Radio Link Control, RLC, entity for SDT between the wireless communication terminal and the second wireless communication node; at least one RLC bearer configuration for SDT between the wireless communication terminal and the second wireless communication node; or at least one downlink cell group, CG, transport network layer, TNL, for SDT between the wireless communication terminal and the second wireless communication node.

Preferably, the control message comprises an RRC message, and the RRC message comprises at least one SDT timer or at least one SDT duration indicating an available time for at least one SDT configuration.

Preferably, the first wireless communication node is configured to transmit a request message to the second wireless communication node to request SDT resource.

Preferably, the first wireless communication node is configured to receive a response message from the second wireless communication node indicating the result of the request for the SDT resource.

Preferably, the response message comprises at least one SDT timer or at least one SDT duration indicating an available time for at least one SDT configuration.

Preferably, the first wireless communication node is configured to acquire information of SDT resource of the second wireless communication node by transmitting an SDT resource query request to the second wireless communication node.

Preferably, the first wireless communication node is configured to receive a request from the wireless communication terminal for the SDT resource for the wireless communication terminal.

Preferably, the first wireless communication node is configured to receive a configuration complete message from the second wireless communication node indicating the SDT resource is configured and the wireless communication terminal enters the RRC inactive mode.

Preferably, the SDT configuration comprises at least one of: at least one SDT resource; at least one SDT index; at least one SDT duration or an SDT timer; or at least one SDT indicator.

Preferably, the SDT configuration is used for SDT between the wireless communication terminal and the second wireless communication node.

Preferably, the RRC message is an RRC release message or an RRC reconfiguration message.

Preferably, the second wireless communication node is configured to receive a request message from the first wireless communication node to request SDT resource.

Preferably, the second wireless communication node is configured to transmit a response message to the first wireless communication node indicating the result of the request for the SDT resource.

Preferably, the second wireless communication node is configured to transmit a configuration complete message to the first wireless communication node indicating at least one SDT resource is configured and the wireless communication terminal enters the RRC inactive mode.

Preferably, the second wireless communication node or the third wireless communication is configured to retain information associated with the wireless communication terminal during transmission of the suspend indication.

Preferably, the SDT configuration and the suspend indication are received in an RRC message from the second wireless communication node.

Preferably, the wireless communication terminal is further configured to receive at least one SDT timer or at least one SDT duration indicating an available time for at least one SDT configuration.

Preferably, the wireless communication terminal is further configured to run the SDT timer, and discard a corresponding SDT configuration in response to the SDT timer being expired.

Preferably, wherein the wireless communication terminal further configured to transmit a request to a first wireless communication node or the third wireless communication node for at least one SDT resource or configuration for the wireless communication terminal.

Preferably, the wireless communication terminal further configured to determine a Hyper System Frame Number, H-SFN, for a starting SDT occasion according to the following equation:

$$H\text{-}SFN = (H\text{-}SFN\_Ref + offset) \bmod 1024 \text{ occurring after } FLOOR(offset/1024) H\text{-}SFN \text{ cycles};$$

wherein H-SFN_Ref is a H-SFN reference, mod is a modulus function, and FLOOR is a floor function.

Preferably, the wireless communication terminal further configured to determine a System Frame Number, SFN, subframe, slot, or OFDM for a starting SDT occasion according to the SDT configuration.

The present disclosure relates to a computer program product including a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
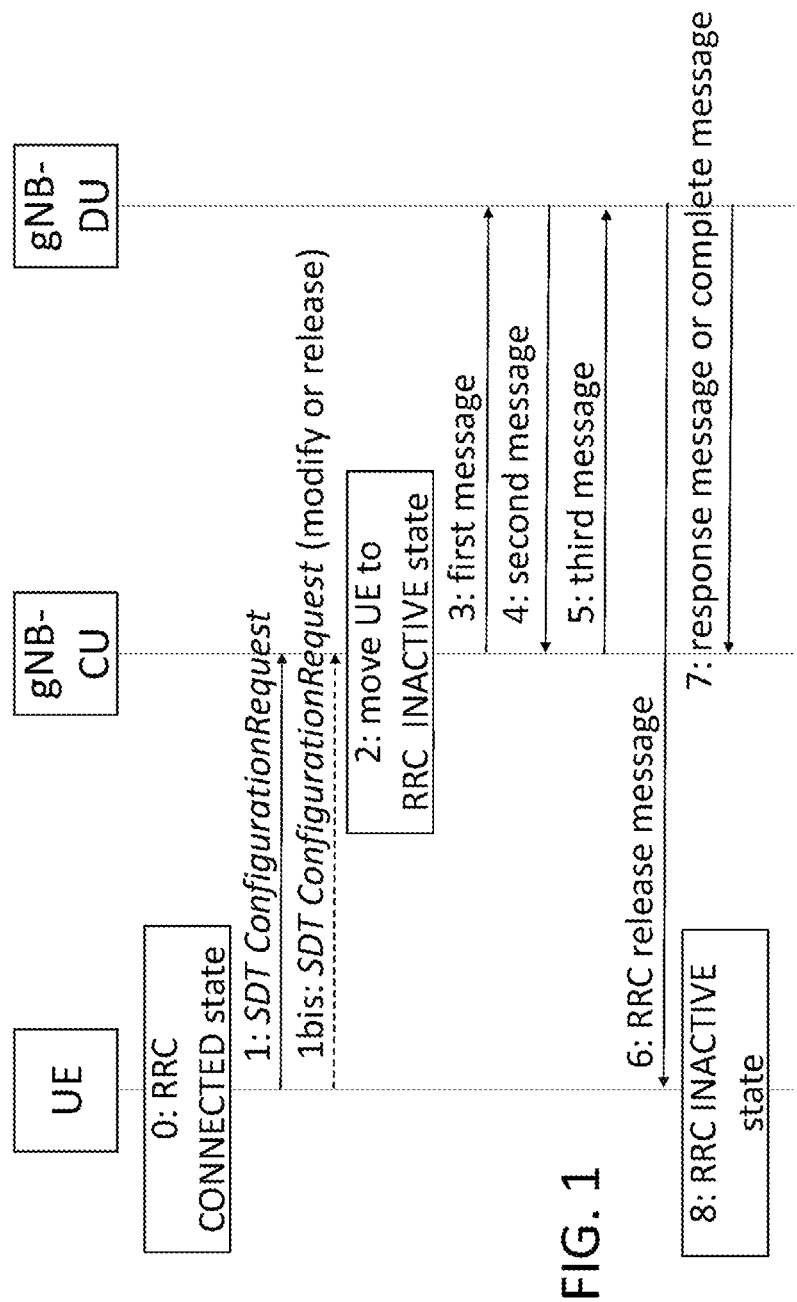
FIG. 1 shows a flowchart of a wireless communication method according to an embodiment of the present disclosure.

Some terms used in this disclosure are specified below.

SDT: small data transmission or specific data transmission

SDT resource: SDT resource may be one of below resources: pre-configured UL resource (PUR), configured-grant resource (CG), or any other pre-configured resource.

SDT configuration: SDT configuration may include at least one of: at least one SDT resource; at least one SDT index; at least one SDT duration or SDT timer; or at least one SDT indicator.

According to an embodiment of the present disclosure, after receiving an RRC message for requesting small data transmission (SDT) configuration from a user equipment (UE), a gNB-CU (gNodeB Central Unit) may initiate a F1AP (F1 application protocol) procedure (e.g., a UE context modification procedure) for an SDT configuration. If the request for the SDT configuration successes, a gNB-DU (gNodeB Distributed Unit) may send a result of requesting the SDT to the gNB-CU and keep storing UE context and DL (downlink) CG (cell group) TNL (transport network layer) address. Besides, the gNB-DU may run an SDT timer for UL data transmission according to SDT resource.

In New Radio (NR) of 5G communication, UEs (user equipments) can enter an RRC_INACTIVE state to reduce power consumption. Typically, in the RRC_INACTIVE state, a UE cannot transmit data. Thus, the UE has to resume connections (i.e., switches back to RRC_CONNECTED state) for downlink (e.g., mobile termination (MT)) and uplink (e.g., mobile originated (MO)) data. However, for the small and infrequent data transmission, building and releasing connections every time when the transmission is need is inefficient and power consuming. Also, it would cause signaling overhead.

Signaling overhead in the INACTIVE state of UEs for small data transmission (SDT) is an issue in 5G communication. In general, devices having a need for transmitting or receiving small data packets in INACTIVE state can benefit from adopting small data transmission in the INACTIVE state.

There are some approaches that can be adopted for SDT in the INACTIVE state, such as 2-step RACH (Random Access Channel), 4-step RACH, and Configured Grant type-1 (CG type-1). Some embodiments of the present disclosure may be implemented based on these approaches.

For the RRC_INACTIVE state:

1) UL small data transmissions for RACH-based schemes (i.e. 2-step and 4-step RACH) include:

general procedure to enable UP (user plane) data transmission for small data packets from the INACTIVE state (e.g. using MsgA or Msg3);

enabling flexible payload sizes larger than the Rel-16 CCCH message size that is possible currently for the INACTIVE state for MsgA and Msg3 to support UP data transmission in UL (actual payload size can depend on the network configuration); and context fetch and data forwarding (with and without anchor relocation) in INACTIVE state for RACH-based solutions.

Note that the security aspects of the operations above may be checked with 3GPP Security Working Group (SA3).

2) Transmission of UL data on pre-configured PUSCH (physical uplink shared channel) resources (i.e. reusing the configured grant type 1) (e.g., when TA (timing advance) is valid) includes:

general procedure for small data transmission over configured grant type 1 resources from the INACTIVE state; and configuration of the configured grant type1 resources for small data transmission in UL for the INACTIVE state;

3) Specifying RRM (Radio Resources Management) core requirements for small data transmission in RRC_INACTIVE, if needed.

The configuration of a CG type 1 resource which is valid in the INACTIVE state may be provided to a UE before the UE enters the INACTIVE state, and the CG resource configuration is only valid in a cell where the UE enters the INACTIVE state.

Besides, the stored configuration in the UE Context may be used for the RLC (Radio Link Control) bearer configuration for different SDT mechanisms (e.g., RACH or CG). CG may use pre-configured PUSCH resources (i.e., pre-configured UL SDT resources) to transmit UL small data.

Under the CU/DU split architecture, some operations for the SDT may be adopted, which includes:

1) A UE and a CU-CP (control plane) store the UE Context when the UE moves into (e.g., enters) the RRC_INACTIVE state.

2) A DU releases the stored UE context when the UE moves into the RRC_INACTIVE state, and corresponding tunnels are established between the DU and the CU-UP (user plane).

3) The CU-UP retains the UE context in a suspended state when the UE is in the RRC_INACTIVE state.

The present disclosure provides a method for keeping the UE context in the gNB-DU when the UE enters the INACTIVE state.

An embodiment of the present disclosure is described with reference to FIG. 1

In Operation 0, the UE is in the RRC connected mode. Both the UE and the cell serving the UE support SDT function.

In Operation 1, the UE may inform the gNB-CU that the UE would like to be configured with the SDT by sending an RRC message (e.g., SDT ConfigurationRequest message). In an embodiment, the RRC message may include an SDT request information about the requested resource (e.g., No. of occurrences, periodicity, time offset, TBS (Transport Block Size), RRC Ack, etc.). In an embodiment, Operation 1 is optional.

In an embodiment, the UE may be configured with one SDT or a set of SDT including multiple SDT resources.

In an embodiment, the UE may be configured with the SDT on a DRB- (data radio bearer) basis. That is, the UE may be configured with the SDT for each DRB supporting SDT. In other words, if there are multiple DRBs supporting SDT, then a corresponding number of SDT can be configured and each PDU (Protocol Data Unit) is used for each DRB.

In Operation 1bis, the UE may request the gNB-CU to further modify or release the configured SDT by using another RRC message (e.g., SDT ConfigurationRequest).

In an embodiment, the gNB-CU (or gNB) may response to the RRC message (e.g., an SDT resource request message) with an RRC message (i.e., confirmation for SDT resource request).

In Operation 2, the gNB-CU decides to move the UE to the RRC_INACTIVE mode.

In Operation 3, the gNB-CU initiates an F1AP procedure, and sends an F1AP message (i.e., a first message) to the gNB-DU for requesting SDT configuration.

This F1AP procedure is used to request the SDT resource. This F1AP procedure can be implemented by modifying the existing UE context modification procedure via adding a new IE (information element) (e.g., IE "SDT configuration request" and IE "SDT configuration response"), or via using a new-defined F1AP procedure (e.g., SDT configuration procedure, including SDT configuration request message and SDT configuration response message).

Correspondingly, the first message in Operation 3 may be a UE context modification request message including an IE "SDT configuration request", or can be an SDT configuration request message.

It should be noted that, in the present disclosure, the SDT configuration procedure can be regarded as being a modification of the UE context modification procedure, and the term SDT configuration procedure and UE context modification procedure may be used alternatively.

In Operation 4, the gNB-DU sends a second message to the gNB-CU to convey the SDT configuration result.

The second message can be a UE context modification response message including an IE "SDT configuration result response", or can be an SDT configuration response message, based on the format of the first message.

If the gNB-DU does not successfully perform the configuration of SDT, it should send the failure information to the gNB-CU. For example, the failure information may be a UE context modification failure message including a cause value (e.g., SDT configuration failure), or an SDT configuration failure message including a cause value (e.g., SDT configuration failure), based on the format of the first message.

Optionally, the SDT configured by the gNB-DU can be one SDT or a set of SDT including multiple SDT resources.

Optionally, each SDT resources can be configured with a specific SDT timer/duration or the set of SDT resources can be configured with a common SDT timer/duration. The SDT timer/duration is set by the gNB-DU and is transferred to the UE included in an RRC message, and is used to indicate availability of the SDT. Each SDT timer is used to indicate one SDT being available or not. After one SDT or a set of SDT is successfully configured, the gNB-DU can start the corresponding SDT timer(s). Until the expiration of an SDT timer, a corresponding SDT is available and can be used by the UE. After the expiration of the SDT timer, the corresponding SDT is unavailable and may be discarded.

In Operation 5, the gNB-CU initiates an F1AP procedure, and sends a third message (e.g., a UE context modification request message or a UE context release command message) to the gNB-DU.

This F1AP procedure is used to instruct the gNB-DU to command the UE to enter the RRC inactive mode from the RRC connected mode, and transfer an RRC release message to the UE to convey the SDT configuration if there is any.

The RRC release message is generated by the gNB-CU and may include a suspend indication and the SDT resource, and may optionally include at least one SDT timer if the SDT timer is configured.

This F1AP procedure can be implemented by modifying a UE context modification procedure or by using an UE context release procedure.

In the case of modifying the UE context release procedure, the third message may a UE context release command message with an IE instructing the gNB-DU not to release the UE associated information it stores. Besides, the third message may include an RRC release message, which contains the SDT configuration.

In some approaches, the UE associated information stored in the gNB-DU (i.e., the UE context stored in the gNB-DU) may be released when the UE context release command message is released. With the IE instructing the gNB-DU not to release the UE associated information, the UE associated information can be kept in the gNB-DU.

In the case of using the UE context modification procedure, the third message is a UE context modification request message. The third message may include an RRC release message, which contains the SDT configuration. In this case, the IE instructing the gNB-DU not to release the UE associated information is not needed because the gNB-DU would not release the UE associated information according to the UE context modification request message. In some embodiments, the gNB-DU may be configured to only keep the UE associated information related to SDT.

The whole UE context is stored in the gNB-CU, and the gNB-DU stores a part of UE context. The part of UE context is referred to as UE associated information stored in the gNB-DU (i.e., UE context stored in the gNB-DU)

When receiving the third message, the gNB-DU may keep all or part of the UE associated information stored in the gNB-DU, in order to support the consequent UL or DL SDT.

In some embodiments, the gNB-DU may keep at least one of following:
1) at least one RLC entity for SDT;
2) at least one RLC bearer configuration for SDT; or
3) at least one DL CG TNL address for SDT.

In Operation 6, the gNB-DU sends the RRC release message to the UE.

In Operation 7, the gNB-DU sends a UE context modification response message or a UE context release complete message to UE based on the format of the third message.

It should be noted that the order of Operation 6 and Operation 7 can be changed, or Operation 6 and Operation 7 can be performed in parallel.

In Operation 8, the UE enters the RRC_INACTIVE state and stores the SDT configuration.

It should be noted that, in an alternative embodiment, an RRC reconfiguration message can be used to replace the RRC release message described above and hereinafter.

Another embodiment of the present disclosure is described with reference to FIG. 2.

Operation 0 to Operation 2 in this embodiment are similar to Operation 0 to Operation 2 in the embodiment corresponding to FIG. 1, and similar description will not be repeated herein.

In Operation 3, the gNB-CU initiates an F1AP procedure, and sends a fourth message (e.g., a UE context modification request message or a UE context release command message) to the gNB-DU.

If the gNB-CU intends to configure the SDT resource for the UE, it can pre-acquire the information of available SDT resources in the gNB-DU (i.e., SDT resources can be used in the gNB-DU). Then, the gNB-CU can configure suitable SDT resource for the UE.

There are some methods for the gNB-CU to pre-acquire the information of available SDT resources in the gNB-DU.

In one embodiment, before Operation 3, the gNB-CU can use a UE-associated F1AP procedure (e.g., a UE context modification procedure) with an SDT resource query to request the information of SDT resource, and acquire the requested information in the response message.

In another embodiment, before Operation 3, the gNB-CU can use a Non UE-associated F1AP procedure (e.g., a gNB-DU Configuration Update message, a gNB-DU Status Indication, a Resource Status Reporting Initiation procedure) with an SDT resource query to request the information of SDT resource, and acquire the requested information in the response message.

This F1AP procedure is used to instruct the gNB-DU to command the UE to enter the RRC inactive mode from the RRC connected mode, transfer an RRC release message to the UE, and transfer the SDT resource configured by the gNB-CU to the UE if there is any.

The RRC release message is generated by the gNB-CU and may include a suspend indication and the SDT resource, and may optionally include at least one SDT timer if it is configured.

This F1AP procedure can be implemented by modifying an UE context modification procedure or by using an UE context release procedure.

In the case of modifying the UE context release procedure, the fourth message may a UE context release command message with an IE instructing the gNB-DU not to release the UE associated information it stores. Besides, the third message may include an RRC release message, which contains the SDT configuration.

In some approaches, the UE associated information stored in the gNB-DU (i.e., the UE context stored in the gNB-DU) may be released when the UE context release command message is released. With the IE instructing the gNB-DU not to release the UE associated information, the UE associated information can be kept in the gNB-DU.

In the case of using the UE context modification procedure, the fourth message is a UE context modification request message. The fourth message may include an RRC release message, which contains the SDT resource configuration. In this case, the fourth message instructs the gNB-DU not to release the UE associated information which is not needed because the gNB-DU would not release the UE associated information according to the UE context modification request message. In some embodiments, the gNB-DU may be configured to only keep the UE associated information related to SDT.

The whole UE context is stored in the gNB-CU, and the gNB-DU stores a part of UE context, this part of UE context is referred to as UE associated information stored in the gNB-DU (i.e., UE context stored in the gNB-DU)

When receiving the fourth message, the gNB-DU may keep all or part of the UE associated information stored in the gNB-DU, in order to support the consequent UL/DL SDT.

Different from the embodiment corresponding to FIG. 1, in this embodiment, the fourth message (either the UE context modification request message or the UE context release command message) sent to the gNB-DU may include an additional IE (e.g., the SDT resource configuration) which is the same IE and as that in the RRC release message. When receiving the fourth message, the gNB-DU may retain the corresponding SDT resource indicated by the fourth message for the SDT with the UE (e.g., after UE enters the RRC INACTIVE mode).

In some embodiments, the gNB-DU may keep at least one of following:
1) at least one RLC entity for SDT;
2) least one RLC bearer configuration for SDT; or
3) at least one DL CG TNL address for SDT.

Operation 4 to Operation 6 in this embodiment are similar to Operation 6 to Operation 8 in the embodiment corresponding to FIG. 1, and similar description will not be repeated herein.

Figure 2:
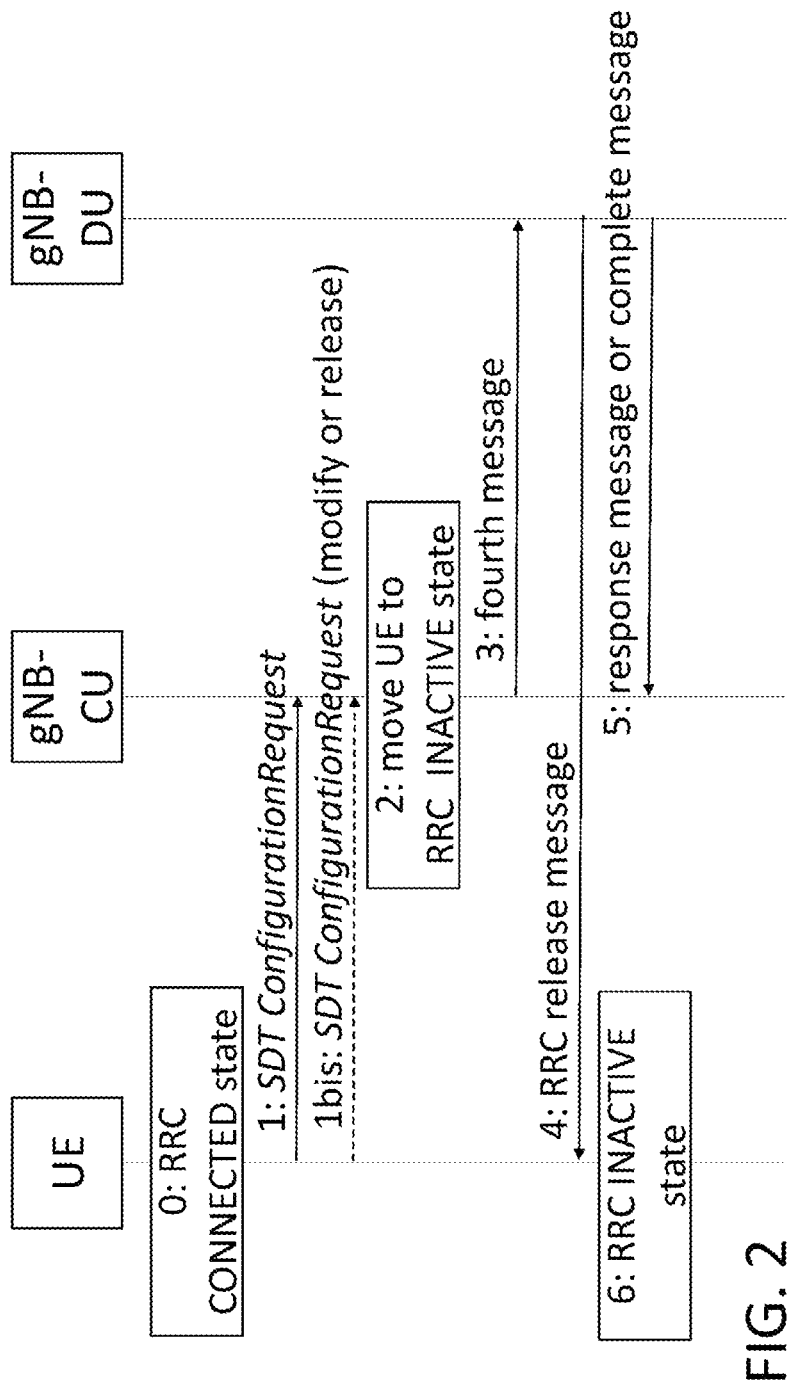
FIG. 2 shows a flowchart of another wireless communication method according to an embodiment of the present disclosure.

Comparing the embodiment corresponding to FIG. 1 (embodiment A) and the embodiment corresponding to FIG. 2 (embodiment B):

1) The embodiment B has a shorter latency. In embodiment B, since the gNB-CU can configure the SDT resource without request to the gNB-DU, some messages can be omitted.

2) In the embodiment B, the gNB-CU may need to acknowledge the SDT resource information in advance. Otherwise, the gNB-CU may not be able to make a suitable configuration.

3) The embodiment is more straightforward, because the SDT resources are stored in the gNB-DU and the gNB-DU can have the most accurate and latest SDT resource information (e.g., availability, radio condition, etc.), so that the gNB-DU can make a better configuration than the gNB-CU can.

Figure 3:
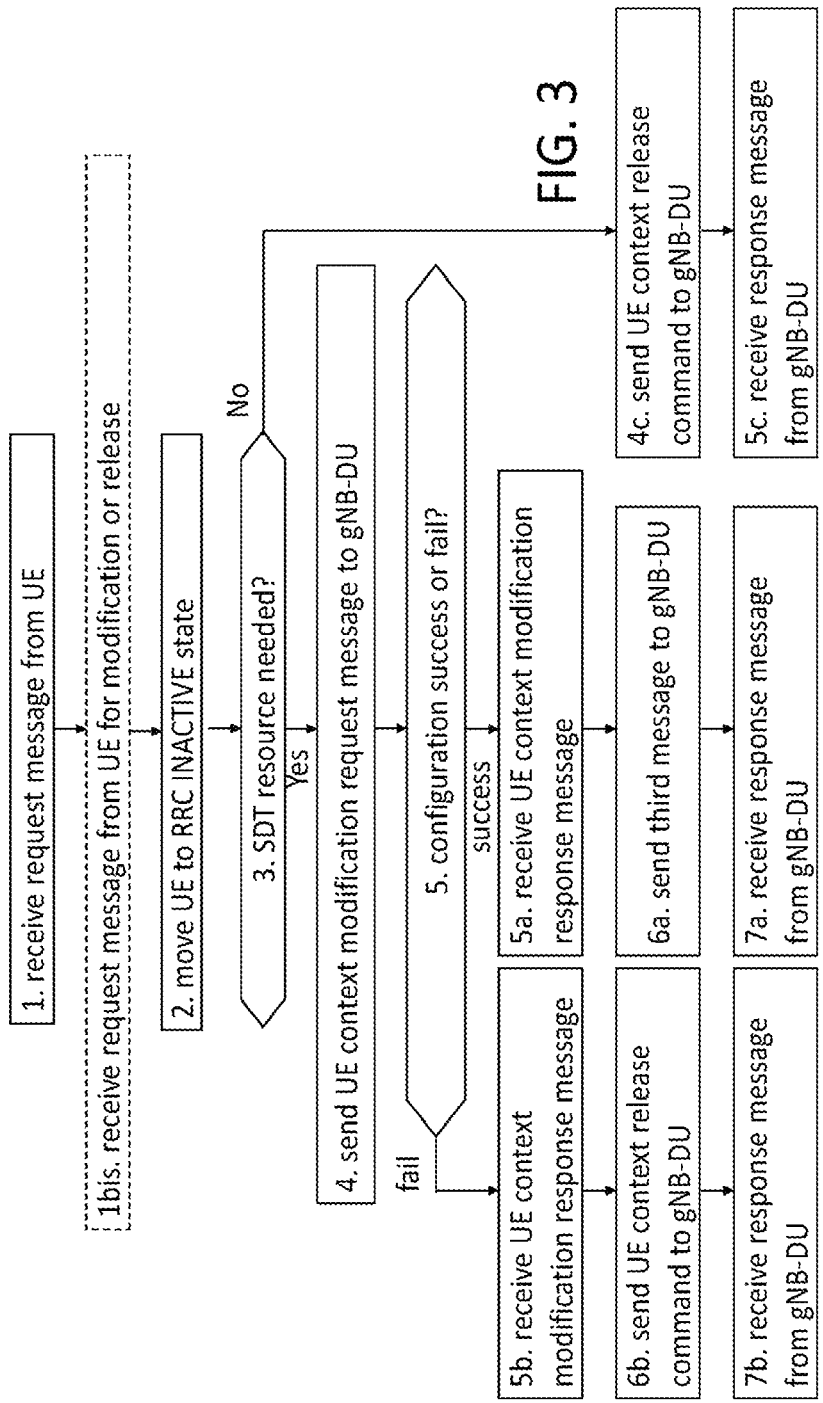
FIG. 3 shows a flowchart of another wireless communication method according to an embodiment of the present disclosure.

Another embodiment of the present disclosure is described with reference to FIG. 3.

In Operation 1, the gNB-CU receives an RRC message (i.e., SDT ConfigurationRequest message) from the UE. This RRC message includes the request for SDT configuration. Details of SDT configuration can be ascertained by referring to the embodiment above, and will not be repeated herein. In an embodiment, Operation 1 is optional.

In Operation 1bis, the gNB-CU receives one or more RRC message from the UE. These RRC messages may request for SDT modifications or SDT releases. In an embodiment, Operation 1bis is optional.

In Operation 2, the gNB-CU decides to move the UE to the RRC INACTIVE state.

In Operation 3, the gNB-CU determines whether the SDT configuration is needed. If so, Operation 4 is executed; if not, Operation 4c is executed, and the gNB-CU sends a UE context release command to the gNB-DU including the RRC release message described above.

In Operation 4, the gNB-CU sends the first message (e.g., a UE context modification request message) described above to the gNB-DU to request the SDT configuration.

In Operation 5, 5a, or 5b, the gNB-CU receives the second message (e.g., a UE context modification response message) including information of the successfully configured SDT resources, or receiving a failure message (e.g., a UE context modification failure message) including the failure cause. It should be noted that, in the case of embodiment B described above, Operation 5, 5a, or 5b, may be omitted.

In Operation 6a or 6b, the gNB-CU sends the third message in a format of the UE context modification request message to the gNB-DU. The third message includes an RRC release message which contains a suspend indicator and an SDT configuration if there is any. Alternatively, the gNB-CU sends the third message in a format of the UE context release command message to the gNB-DU. In this case, the third message includes an indication instructing the gNB-DU to keep the UE associated information and an SDT configuration if there is any.

In Operation 7a, 7b, or 5c, the gNB-CU receives a response message (e.g., a UE context modification response message or a UE context release complete message) from the gNB-DU.

Figure 4:
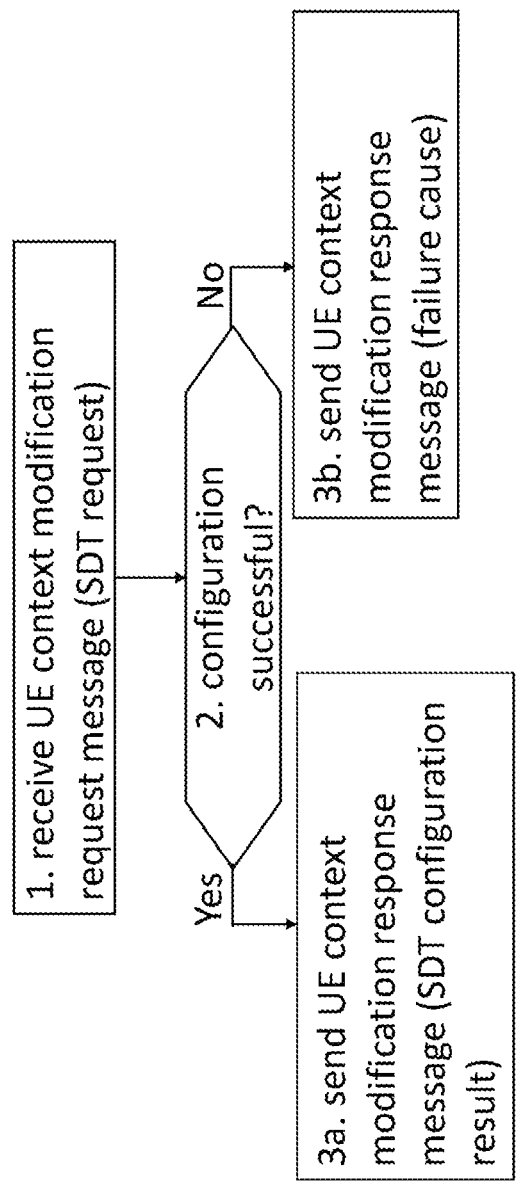
FIG. 4 shows a flowchart of another wireless communication method according to an embodiment of the present disclosure.

Another embodiment of the present disclosure is described with reference to FIG. 4.

In Operation 1, the gNB-DU receives the third message (e.g., a UE context modification request message) from the gNB-CU, which includes SDT configuration request information.

In Operation 2, the gNB-DU determines whether the SDT configuration request can be fulfilled (e.g., whether the SDT resources can be configured successfully). If so, Operation 3a is executed and the gNB-DU sends a response message (e.g., a UE context modification response message) including the configured SDT resources to the gNB-CU. If not, Operation 3b is executed and the gNB-DU sends a failure message (e.g., a UE context modification failure message) including the failure cause to the gNB-CU.

If the SDT resources can be successfully configured, the UE context modification response message sent by the gNB-DU may include a corresponding SDT timer.

If the SDT timer is configured, the gNB-DU runs the SDT timer. The gNB-DU may store information of the corresponding SDT and can perform the corresponding SDT until the expiration of the SDT timer. After the expiration of the SDT timer, the gNB-DU may discard the information of the corresponding SDT.

Figure 5:
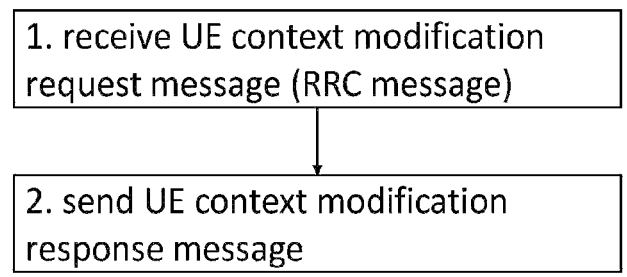
FIG. 5 shows a flowchart of another wireless communication method according to an embodiment of the present disclosure.

Another embodiment of the present disclosure is described with reference to FIG. 5.

In Operation 1, the gNB-DU receive the third or fourth message (e.g., a UE context modification request message) from the gNB-CU. The third or fourth message includes an RRC message.

In Operation 2, the gNB-DU sends the RRC message included in the UE context modification request message to the UE and sends the UE context modification response message to the gNB-CU.

From the gNB-DU's aspect, it does not decode the RRC message, but only transparently transfers the RRC message to the UE.

Figure 6:
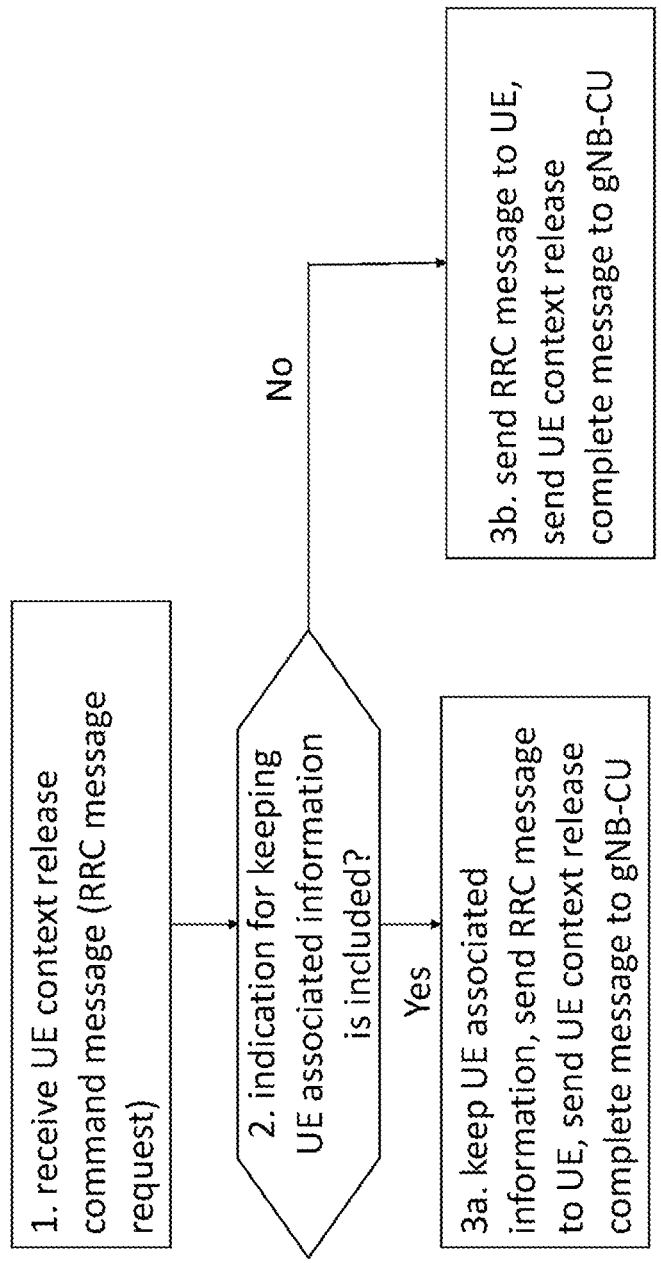
FIG. 6 shows a flowchart of another wireless communication method according to an embodiment of the present disclosure.

Another embodiment of the present disclosure is described with reference to FIG. 6.

In Operation 1, the gNB-DU receives a UE context release command message and an RRC message from gNB-CU.

In Operation 2, if the UE context release command message includes an indication for keeping the UE associated information, Operation 3a is performed. Otherwise, Operation 3b is performed.

In Operation 3a, the gNB-DU keeps the UE associated information, sends the RRC message to the UE, and sends UE context release complete message to the gNB-CU.

In Operation 3b, the gNB-DU sends the RRC message to UE, and sends a UE context release complete message to the gNB-CU.

From the gNB-DU's aspect, it does not decode the RRC message, but only transparently transfers the RRC message to the UE.

In an embodiment of the present disclosure, the UE may perform the operations below.

In Operation 0, the UE is in an RRC connected mode and the corresponding cell and the UE support SDT function.

In Operation 1, optionally, the UE sends an RRC message (e.g., an SDT ConfigurationRequest message) to the gNB or the gNB-CU to request an SDT configuration.

In Operation 1bis, optionally, the UE sends one or more other RRC messages to gNB-CU to request SDT modification or SDT release.

In Operation 1a, optionally, the UE may receive an RRC message (a confirm SDT ConfigurationRequest message) from the gNB or the gNB-CU.

In Operation 2, the UE receives an RRC release message including an SDT configuration. Details of the SDT configuration can be ascertained by referring to the paragraphs above.

In Operation 3, the UE is in the RRC INACTIVE state, and the UE is able to transmit data based on the SDT configuration.

In an embodiment, if an SDT timer or an SDT duration is included in the SDT configuration, the UE may transmit data based on the SDT configuration before the timer or duration expires. The UE does not transmit data based on the SDT configuration after the SDT timer/duration expired.

In an embodiment, the UE stores UE context and information of the SDT resources. If an SDT timer or duration is included in the SDT resources, the UE stores and utilizes the SDT duration or runs the SDT timer.

The SDT timer/duration is sent by the gNB-CU or the gNB and is used to indicate availability of SDT. There can be more than one timer/duration for each SDT.

In one embodiment, the UE is configured to determine a Hyper System Frame Number (H-SFN) for a starting SDT occasion according to the following equation:

$$H\text{-}SFN = (H\text{-}SFN\_Ref + offset) \bmod 1024 \text{ occurring after } FLOOR(offset/1024) H\text{-}SFN \text{ cycles;}$$

H-SFN_Ref is a H-SFN reference, mod is a modulus function, and FLOOR is a floor function.

In one embodiment, the UE is configured to determine a System Frame Number, SFN, subframe, slot, or OFDM for a starting SDT occasion according to the SDT configuration.

Figure 7:
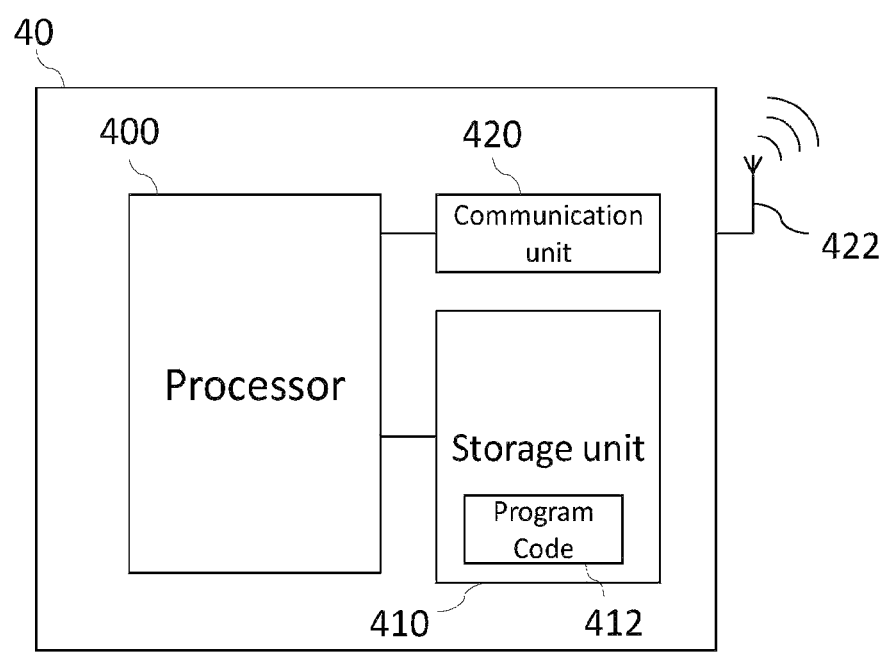
FIG. 7 shows an example of a schematic diagram of a wireless communication terminal according to an embodiment of the present disclosure.

FIG. 7 relates to a schematic diagram of a wireless communication terminal 40 (e.g., a terminal node or a terminal device) according to an embodiment of the present disclosure. The wireless communication terminal 40 may be a user equipment (UE), a mobile phone, a laptop, a tablet computer, an electronic book or a portable computer system and is not limited herein. The wireless communication terminal 40 may include a processor 400 such as a microprocessor or Application Specific Integrated Circuit (ASIC), a storage unit 410 and a communication unit 420. The storage unit 410 may be any data storage device that stores a program code 412, which is accessed and executed by the processor 400. Embodiments of the storage code 412 include but are not limited to a subscriber identity module (SIM), read-only memory (ROM), flash memory, random-access memory (RAM), hard-disk, and optical data storage device. The communication unit 420 may a transceiver and is used to transmit and receive signals (E.g., messages or packets) according to processing results of the processor 400. In an embodiment, the communication unit 420 transmits and receives the signals via at least one antenna 422.

In an embodiment, the storage unit 410 and the program code 412 may be omitted and the processor 400 may include a storage unit with stored program code.

The processor 400 may implement any one of the steps in exemplified embodiments on the wireless communication terminal 40, e.g., by executing the program code 412.

The communication unit 420 may be a transceiver. The communication unit 420 may as an alternative or in addition be combining a transmitting unit and a receiving unit configured to transmit and to receive, respectively, signals to and from a wireless communication node.

In some embodiments, the wireless communication terminal 40 may be used to perform the operations of the UE described above. In some embodiments, the processor 400 and the communication unit 420 collaboratively perform the operations described above. For example, the processor 400 performs operations and transmit or receive signals, message, and/or information through the communication unit 420.

Figure 8:
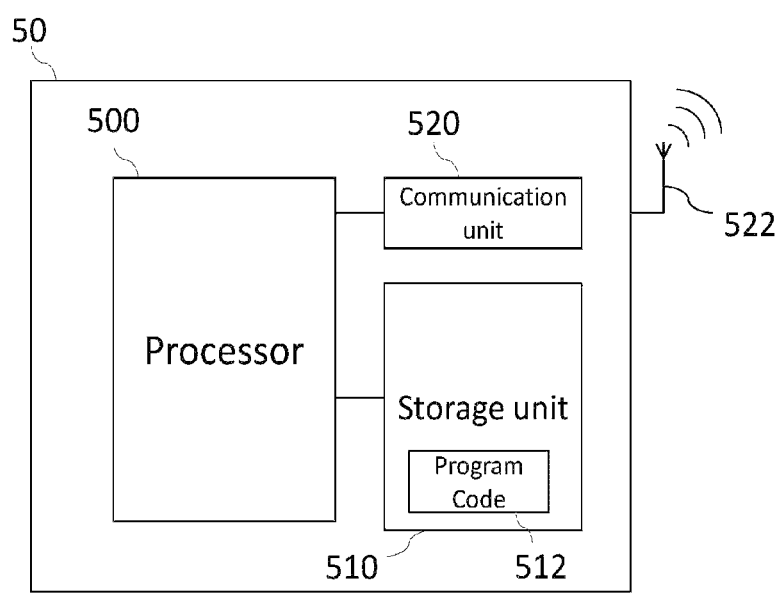
FIG. 8 shows an example of a schematic diagram of another wireless communication node according to another embodiment of the present disclosure.

FIG. 8 relates to a schematic diagram of a wireless communication node 50 (e.g., a network device) according to an embodiment of the present disclosure. The wireless communication node 50 may be a satellite, a base station (BS) (e.g., a gNB-CU or a gNB-DU), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless communication node 50 may include (perform) at least one network function such as an access and mobility management function (AMF), a session management function (SMF), a user place function (UPF), a policy control function (PCF), an application function (AF), etc. The wireless communication node 50 may include a processor 500 such as a microprocessor or ASIC, a storage unit 510 and a communication unit 520. The storage unit 510 may be any data storage device that stores a program code 512, which is accessed and executed by the processor 500. Examples of the storage unit 512 include but are not limited to a SIM, ROM, flash memory, RAM, hard-disk, and optical data storage device. The communication unit 520 may be a transceiver and is used to transmit and receive signals (E.g., messages or packets) according to processing results of the processor 500. In an example, the communication unit 520 transmits and receives the signals via at least one antenna 522.

In an embodiment, the storage unit 510 and the program code 512 may be omitted. The processor 500 may include a storage unit with stored program code.

The processor 500 may implement any steps described in exemplified embodiments on the wireless communication node 50, e.g., via executing the program code 512.

The communication unit 520 may be a transceiver. The communication unit 520 may as an alternative or in addition be combining a transmitting unit and a receiving unit configured to transmit and to receive, respectively, signals, messages, or information to and from a wireless terminal (E.g., a user equipment).

In some embodiments, the wireless communication node 50 may be used to perform the operations of the gNB-CU or the gNB-DU described above. In some embodiments, the processor 500 and the communication unit 520 collaboratively perform the operations described above. For example, the processor 500 performs operations and transmit or receive signals through the communication unit 520.

A wireless communication method is also provided according to an embodiment of the present disclosure. In an embodiment, the wireless communication method may be performed by using a first wireless communication node (e.g., a gNB-CU). In an embodiment, the first wireless communication node may be implemented by using the wireless communication node 50 described above, but is not limited thereto.

In an embodiment, the wireless communication method includes transmitting, by a first wireless communication node, a control message to a second wireless communication node, to control the second wireless communication node to instruct a wireless communication terminal to enter a radio resource control, RRC, inactive mode and transmitting at least one small data transmission, SDT, configuration to the wireless communication terminal.

Details in this regard can be ascertained with reference to the paragraphs above, and will not be repeated herein.

Another wireless communication method is also provided according to an embodiment of the present disclosure. In an embodiment, the wireless communication method may be performed by using a second wireless communication node (e.g., a gNB-DU). In an embodiment, the second wireless communication node may be implemented by using the wireless communication node 50 described above, but is not limited thereto.

In an embodiment, the wireless communication method includes: receiving, by a second wireless communication node, a control message from a first wireless communication node; transmitting, by the second wireless communication node, an RRC message to a wireless communication terminal, the RRC message is included in the control message from a first wireless communication node; and refraining, by the second wireless communication node, from releasing information associated with the wireless communication terminal according to the control message.

Details in this regard can be ascertained with reference to the paragraphs above, and will not be repeated herein.

Another wireless communication method is also provided according to an embodiment of the present disclosure. In an embodiment, the wireless communication method may be performed by using a wireless communication terminal (e.g., a UE). In an embodiment, the wireless communication terminal may be implemented by using the wireless communication terminal 40 described above, but is not limited thereto.

In an embodiment, the wireless communication method includes: receiving, by a wireless communication terminal, a suspend indication from a second wireless communication node or a third wireless communication to enter a radio resource control, RRC, inactive mode according to the suspend indication; and receiving, by the wireless communication terminal, at least one small data transmission, SDT, configuration from the second wireless communication node or the third wireless communication.

In one embodiment, the third wireless communication is a gNB not being separated into CU and DU.

Details in this regard can be ascertained with reference to the paragraphs above, and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:
   transmitting, by a first wireless communication node, a control message to a second wireless communication node, to control the second wireless communication node to instruct a wireless communication terminal to enter a radio resource control (RRC) inactive mode and to transmit at least one small data transmission (SDT) configuration to the wireless communication terminal,
   wherein the control message comprises an information element for preventing the second wireless communication node from releasing information associated with the wireless communication terminal,
   wherein the information associated with the wireless communication terminal is used for SDT between the wireless communication terminal and the second wireless communication node,
   wherein the control message comprises an RRC message comprising the SDT configuration and a suspend indication for making the wireless communication terminal enter the RRC inactive mode, and the second wireless communication node is configured to forward the RRC message to the wireless communication terminal transparently, and
   wherein, the RRC message is an RRC release message.

2. The wireless communication method of claim 1, wherein the information associated with the wireless communication terminal comprises at least one of following:

at least one Radio Link Control (RLC) entity for SDT between the wireless communication terminal and the second wireless communication node; or at least one RLC bearer configuration for SDT between the wireless communication terminal and the second wireless communication node.

3. The wireless communication method of claim 1, wherein the first wireless communication node is configured to transmit a request message to the second wireless communication node to request SDT resource;

wherein the first wireless communication node is configured to receive a response message from the second wireless communication node indicating a result of the request for the SDT resource.

4. The wireless communication method of claim 1, wherein the first wireless communication node is configured to receive a configuration complete message from the second wireless communication node indicating SDT resource is configured and the wireless communication terminal enters the RRC inactive mode;

wherein the SDT configuration comprises:

at least one SDT resource.

5. A wireless communication method comprising:

receiving, by a second wireless communication node, a control message from a first wireless communication node;

based on the control message, instructing, by the second wireless communication node, a wireless communication terminal to enter a radio resource control (RRC) inactive mode and transmitting at least one small data transmission (SDT) configuration to the wireless communication terminal;

transmitting an RRC message to the wireless communication terminal, the RRC message is included in the control message from the first wireless communication node;

refraining from releasing information associated with the wireless communication terminal according to the control message, wherein the control message comprises an information element for preventing the second wireless communication node from releasing information associated with the wireless communication terminal, wherein the information associated with the wireless communication terminal is used for SDT between the wireless communication terminal and the second wireless communication node, wherein the control message comprises the RRC message comprising the SDT configuration and a suspend indication for making the wireless communication terminal enter the RRC inactive mode, and forwarding the RRC message to the wireless communication terminal transparently, wherein, the RRC message is an RRC release message.

6. The wireless communication method of claim 5, wherein the information associated with the wireless communication terminal comprises at least one of following:

at least one RLC entity for SDT between the wireless communication terminal and the second wireless communication node; or at least one RLC bearer configuration for SDT between the wireless communication terminal and the second wireless communication node.

7. The wireless communication method of claim 5, further comprising:

receiving, by the second wireless communication node, a request message from the first wireless communication node to request SDT resource; and transmitting, by the second wireless communication node, a response message to the first wireless communication node indicating a result of the request for the SDT resource.

8. The wireless communication method of claim 5, further comprising:

transmitting, by the second wireless communication node, a configuration complete message to the first wireless communication node, wherein the configuration complete message indicates that at least one SDT resource is configured and the wireless communication terminal enters the RRC inactive mode;

wherein the SDT configuration comprises:

at least one SDT resource;

wherein the SDT configuration is used for SDT between the wireless communication terminal and the second wireless communication node.

9. A wireless communication node, comprising:

a at least one processor configured to transmit, via a transmitter, a control message to a second wireless communication node, to control the second wireless communication node to instruct a wireless communication terminal to enter a radio resource control (RRC) inactive mode and to transmit at least one small data transmission (SDT) configuration to the wireless communication terminal, wherein the control message comprises an information element for preventing the second wireless communication node from releasing information associated with the wireless communication terminal, wherein the information associated with the wireless communication terminal is used for SDT between the wireless communication terminal and the second wireless communication node, wherein the control message comprises an RRC message comprising the SDT configuration and a suspend indication for making the wireless communication terminal enter the RRC inactive mode, and the processor is configured to forward the RRC message to the wireless communication terminal transparently, and wherein, the RRC message is an RRC release message.

10. The wireless communication node of claim 9, wherein the information associated with the wireless communication terminal comprises at least one of following:

at least one RLC entity for SDT between the wireless communication terminal and the second wireless communication node; or at least one RLC bearer configuration for SDT between the wireless communication terminal and the second wireless communication node.

11. The wireless communication node of claim 9, wherein the at least one processor is configured to transmit a request message to the second wireless communication node to request SDT resource;

wherein the processor is configured to receive a response message from the second wireless communication node indicating a result of the request for the SDT resource.

12. The wireless communication node of claim 9, wherein the at least one processor is configured to receive a configuration complete message from the second wireless communication node indicating SDT resource is configured and the wireless communication terminal enters the RRC inactive mode;

wherein the SDT configuration comprises:
at least one SDT resource.

13. A wireless communication node, comprising:
a
at least one processor configured to:
   receive, via a transceiver, a control message from a first wireless communication node;
   based on the control message, instruct, via the transceiver, a wireless communication terminal to enter a radio resource control (RRC) inactive mode and transmit at least one small data transmission (SDT) configuration to the wireless communication terminal;
   transmit, via the transceiver, an RRC message to the wireless communication terminal, the RRC message is included in the control message from the first wireless communication node;
   refrain from releasing information associated with the wireless communication terminal according to the control message,
   wherein the control message comprises an information element for preventing the wireless communication node from releasing information associated with the wireless communication terminal,
   wherein the information associated with the wireless communication terminal is used for SDT between the wireless communication terminal and the wireless communication node,
   wherein the control message comprises the RRC message comprising the SDT configuration and a suspend indication for making the wireless communication terminal enter the RRC inactive mode, and forward, via the transceiver, the RRC message to the wireless communication terminal transparently,
   wherein, the RRC message is an RRC release message.

14. The wireless communication node of claim 13, wherein the information associated with the wireless communication terminal comprises at least one of following:
   at least one RLC entity for SDT between the wireless communication terminal and the wireless communication node; or
   at least one RLC bearer configuration for SDT between the wireless communication terminal and the wireless communication node.

15. The wireless communication node of claim 13, wherein the at least one processor is configured to receive a request message from the first wireless communication node to request SDT resource;
   wherein the processor is configured to transmit a response message to the first wireless communication node indicating a result of the request for the SDT resource.

16. The wireless communication node of claim 13, wherein the at least one processor is configured to transmit a configuration complete message to the first wireless communication node, wherein the configuration complete message indicates that at least one SDT resource is configured and the wireless communication terminal entering the RRC inactive mode;
   wherein the SDT configuration comprises:
at least one SDT resource;
   wherein the SDT configuration is used for SDT between the wireless communication terminal and the wireless communication node.

* * * * *